(12) United States Patent
Boden et al.

(10) Patent No.: US 9,271,513 B2
(45) Date of Patent: Mar. 1, 2016

(54) CONNECTION PIECE

(75) Inventors: Hannjo Boden, Detmold (DE);
Bernhard Bauer, Oberuzwil (CH)

(73) Assignee: BÜHLER AG, Uzwil (CH)

( * ) Notice: Subject to any disclaimer, the term of this patent is extended or adjusted under 35 U.S.C. 154(b) by 0 days.

(21) Appl. No.: 13/133,840

(22) PCT Filed: Dec. 14, 2009

(86) PCT No.: PCT/EP2009/067116
§ 371 (c)(1),
(2), (4) Date: Jun. 9, 2011

(87) PCT Pub. No.: WO2010/066910
PCT Pub. Date: Jun. 17, 2010

(65) Prior Publication Data
US 2011/0241332 A1  Oct. 6, 2011

(30) Foreign Application Priority Data
Dec. 12, 2008  (DE) .......................... 10 2008 055 518

(51) Int. Cl.
*F16L 55/00* (2006.01)
*A23G 1/20* (2006.01)
*A23G 3/02* (2006.01)

(52) U.S. Cl.
CPC .............. *A23G 1/206* (2013.01); *A23G 3/0257* (2013.01)

(58) Field of Classification Search
CPC ............................ A23G 3/0273; A23G 1/206
USPC ..................... 222/566–570, 490, 494; 285/23
See application file for complete search history.

(56) References Cited

U.S. PATENT DOCUMENTS

| | | | | |
|---|---|---|---|---|
| 299,228 A * | 5/1884 | Kirsten | .......................... | 425/191 |
| 2,296,861 A * | 9/1942 | Matter | .......................... | 118/259 |
| 2,529,146 A * | 11/1950 | Feitl | .............................. | 425/191 |
| 2,620,756 A * | 12/1952 | Krens | .......................... | 425/191 |
| 2,753,091 A * | 7/1956 | Herzig | .......................... | 222/491 |
| 3,211,340 A * | 10/1965 | Zander et al. | ................... | 222/95 |

(Continued)

FOREIGN PATENT DOCUMENTS

| | | |
|---|---|---|
| DE | 1123545 | 2/1962 |
| DE | 1965091 | 7/1970 |

(Continued)

OTHER PUBLICATIONS

European Office Action issued in corresponding European Application No. 09 771 748.2 mailed Nov. 27, 2015.

*Primary Examiner* — Donnell Long
(74) *Attorney, Agent, or Firm* — Davis & Bujold PLLC; Michael J. Bujold

(57) ABSTRACT

The aim of the invention is to be able to arrange or secure an elastic nozzle in a device, especially a casting machine, using simple design measures while allowing the nozzle to be quickly replaced in the device using simple mounting steps. Said aim is achieved by a connection piece (1) which is particularly suitable for securing an elastic nozzle (3) in a casting machine. The connection piece (1) preferably has a hollow cylindrical shape and includes a securing mechanism (4), especially a thread, at one end. A clamping unit (2) is connected to the connection piece (1). The connection piece (1) and/or the clamping unit (2) has/have a receptacle for the nozzle (3), and the nozzle (3) is connected to the connection piece (1).

20 Claims, 8 Drawing Sheets

(56) References Cited

U.S. PATENT DOCUMENTS

| | | | |
|---|---|---|---|
| 3,214,102 A * | 10/1965 | Meyer | 239/107 |
| 3,258,175 A * | 6/1966 | Taylor | 222/380 |
| 3,366,261 A * | 1/1968 | Dewey | 215/11.4 |
| 3,430,816 A * | 3/1969 | Nadherny et al. | 222/146.5 |
| 3,847,523 A * | 11/1974 | Parrish et al. | 425/191 |
| 4,168,727 A | 9/1979 | Yoshida | |
| 4,454,967 A * | 6/1984 | Carr | 222/213 |
| 4,566,612 A * | 1/1986 | von Kreuter | 222/309 |
| 4,877,160 A * | 10/1989 | Derving | 222/494 |
| 4,961,517 A * | 10/1990 | Tkac | 222/94 |
| 5,213,236 A * | 5/1993 | Brown et al. | 222/212 |
| 5,950,878 A * | 9/1999 | Wade et al. | 222/207 |
| 6,199,725 B1 * | 3/2001 | Garibaldi | 222/207 |
| 6,478,567 B1 * | 11/2002 | Kushnir et al. | 425/191 |
| 6,910,877 B2 * | 6/2005 | Berceanu et al. | 425/547 |
| 7,478,736 B2 * | 1/2009 | Morgan | 222/107 |
| 8,127,971 B1 * | 3/2012 | Chininis et al. | 222/333 |
| 2004/0124210 A1 * | 7/2004 | Bartlein | 222/92 |
| 2007/0000943 A1 | 1/2007 | Morgan | |
| 2007/0295763 A1 * | 12/2007 | Brunner et al. | 222/494 |
| 2008/0089967 A1 | 4/2008 | Bourque | |

FOREIGN PATENT DOCUMENTS

| | | |
|---|---|---|
| DE | 2433838 | 2/1975 |
| DE | 3410302 | 9/1985 |
| DE | 29905283 | 7/1999 |
| DE | 10103219 | 8/2001 |
| DE | 202004007671 | 10/2004 |
| DE | 102007024028 | 11/2008 |
| EP | 0865736 | 9/1998 |
| GB | 247063 | 2/1926 |
| WO | WO 2007087731 A1 * | 8/2007 |

* cited by examiner

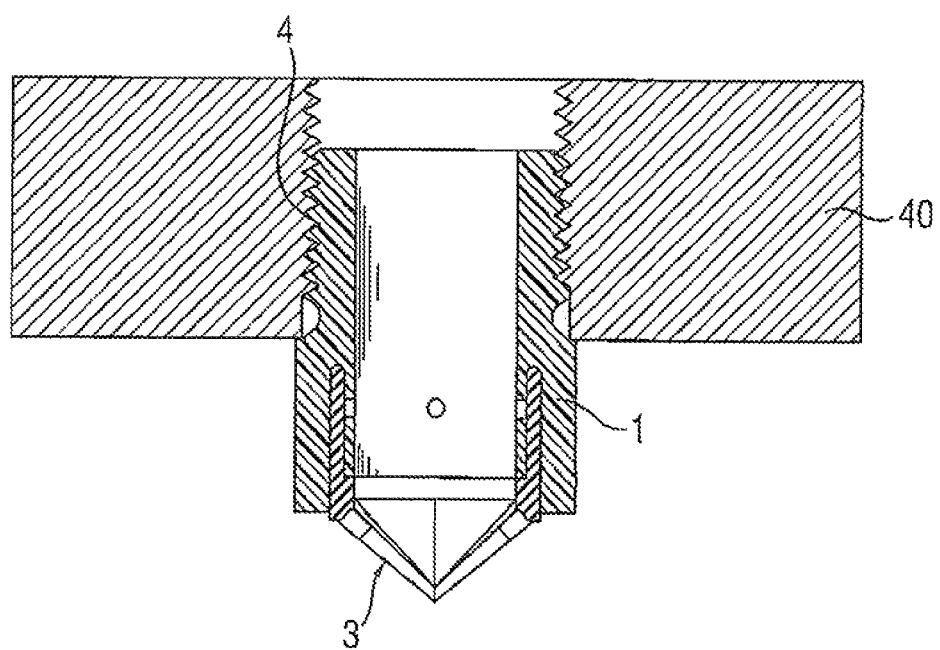

CONNECTION PIECE

The invention relates to a connection piece which is suitable in particular for fastening an elastic nozzle in a casting machine.

Document DE 34 10 302 C2 shows the nozzles fastened in a nozzle plate of a casting machine. The nozzles consist of an inelastic material, for example steel, and are produced by machining. The nozzles are pressed into the nozzle plate or are welded thereto. The mounted nozzles can then be replaced only to a limited degree and with great effort.

The present invention is based on the object of being able to arrange or fasten an elastic nozzle by way of structurally simple means in a device, in particular in a casting machine, and at the same time of allowing the nozzle to be replaced rapidly in the device by way of simple mounting steps.

This object is achieved according to the invention by a connection piece having the features of claim 1.

The connection piece is arranged, in particular can be screw-mounted, in a nozzle plate of a casting machine. The casting machine can cast for example liquids, and in particular a chocolate mass. The connection piece preferably has a hollow cylindrical form in order that the liquid can pass through the connection piece into the nozzle and from there to a casting point. A first end of the connection piece has a fastening device, which is in particular a thread. This thread is screwed into the nozzle plate so that the connection piece is connected firmly to the nozzle plate. The nozzle is arranged in the connection piece preferably even before the connection piece is mounted in the nozzle plate. In order that the nozzle is held securely in the connection piece, there is provided a clamping unit which can be connected to the second end of the connection piece. The connection piece and/or the clamping unit can have a holder for the nozzle so that the nozzle can be connected to the connection piece. The nozzle is then mounted in the nozzle plate with the aid of the connection piece. A defective elastic nozzle can be replaced easily in that the nozzle connected to the connection piece is removed from the nozzle plate and is replaced by a connection piece which has a new nozzle.

The connection piece and the clamping unit are structurally simple components which can be produced cost-effectively, for example on an automatic lathe or as injection-molded parts.

Advantageously, the inside diameter of the connection piece is smaller than an outside diameter of the nozzle, in order that the nozzle is compressed in the radial direction. This influences the casting properties of the nozzles and allows clean casting of the mass by way of a casting machine.

It is favorable for an internal cylinder of the hollow cylinder to have a conical region at the end having the fastening device of the connection piece, in order that the mass to be cast can run into the connection piece and the nozzle through this funnel shape.

Advantageously, the connection piece has a surface for holding a flange surface of the nozzle, so that the nozzle butts against this surface during mounting and can be fixed precisely.

The connection piece according to the invention has particular advantages when the connection piece has a groove for holding a flange of the nozzle. The nozzle sits in the groove and the clamping unit can ensure that the nozzle is fastened securely.

It is conceivable that one surface of the connection piece, preferably the outer surface, can be connected to the nozzle in order to fix the nozzle in the connection piece by way of the clamping force that occurs between the nozzle and the connection piece. This has the advantage that the additional clamping unit can be dispensed with if there is a sufficiently large clamping force.

In a particularly advantageous embodiment of the invention, the outer surface of the connection piece can have a mounting device, in particular a width across flats or a knurl. This mounting device makes it easier to fasten the connection piece, in particular in a nozzle plate of a casting machine, since the width across flats or a knurl represents an optimal engagement surface for a mounting tool or enables the connection piece to be screwed in by hand.

It is particularly favorable for the nozzle to be arranged in a recessed manner in the connection piece in order that the nozzle can be fastened securely in the connection piece. Furthermore, the connection piece can support the nozzle against an inner surface of the connection piece and facilitate the use of the nozzle in a casting machine.

Advantageously, the connection piece can have a fastening device, in particular a thread, at both ends, so that the connection piece can be fastened in a device in a casting machine and furthermore the nozzle can be fastened to the connection piece by way of a device which can be formed for example as a union nut.

It is particularly favorable for the connection piece to consist of metal, in particular a corrosion-resistant steel or stainless steel, or of aluminum or of plastic, in particular POM 6, since these materials are food-compatible.

In an advantageous embodiment of the invention, it is possible that the connection piece can be connected, in particular welded, to the nozzle and/or the clamping unit, in order to improve the fastening of the nozzle and to provide the replacement part in a more customer-friendly manner.

It is conceivable that a sleeve can be arranged in the connection piece, in order thereby to improve the stability of the connection piece.

In a further embodiment of the invention, at least one securing element can be arranged perpendicularly to the center axis in the connection piece and the clamping unit in order in this way to allow particularly reliable connection of the parts. These securing elements may be pins or splint pins or threaded pins having a securing means.

The object is furthermore achieved by a connection piece, which is suitable in particular for fastening an elastic nozzle in a casting machine, wherein the connection piece preferably has a hollow cylindrical form and has a fastening device, in particular a thread, at one end, and a clamping unit which can be connected to the connection piece. The connection piece and/or the clamping unit have/has a holder for the nozzle and the nozzle can be connected to the connection piece. The connection piece has a fastening device, in particular a thread, at both ends, wherein the nozzle can be fastened to the connection piece by way of a device which is formed for example as a union nut.

The object mentioned at the beginning is also achieved by a clamping unit having the features of claim 14.

The clamping unit facilitates the fastening of the nozzle to a connection piece, wherein the clamping unit is preferably a structurally particularly simple element in the form of a hollow cylinder. One surface of the clamping unit can be connected to the nozzle. The clamping unit allows the nozzle to be replaced rapidly in the device, in particular in the casting machine, by way of simple mounting steps, since only the clamping unit has to be released from the nozzle and/or the connection piece in order to replace the nozzle.

The clamping unit and the seat of the clamping unit on the connection piece can be embodied such that, in order to replace the nozzle, the nozzle and/or the clamping unit have to be destroyed, that is to say the nozzle and/or the clamping unit cannot be removed without being destroyed and in the event of a replacement being made both the nozzle and the clamping unit are renewed.

Alternatively, the clamping unit can be embodied such that, in order to replace the nozzle, said clamping unit has to be removed and reattached using a special tool provided for that purpose. The clamping unit can have for this purpose, for example, recesses which have a particular profile and into which an appropriate tool can be inserted.

The nozzle can be exchanged while the connection part remains on the casting machine or after the connection part has been released from the casting machine.

It is favorable for the clamping unit to be able to fasten the nozzle in or to the connection piece, since the nozzle is exposed primarily to a force along the center axis while it is used in a casting machine and the nozzle can thus be secured optimally in the connection piece.

In an advantageous embodiment, the clamping unit is arranged in the connection piece so that the connection piece forms a closed component in which only the nozzle protrudes beyond the edges of the connection piece. This embodiment affords considerable advantages not only for the absorption of force but also for the cleaning of the connection piece.

In a particularly advantageous embodiment of the invention, the outer surface of the clamping unit can have a mounting device, in particular a thread or a width across flats or a knurl, as a result of which it is possible to accelerate the mounting of the clamping unit with the nozzle on the connection piece.

Advantageously, the clamping unit consists of metal, in particular a corrosion-resistant steel or stainless steel, or of aluminum or of plastic, in particular POM 6, since these materials are food-compatible.

The object is furthermore achieved by a casting machine having a connection piece as described above.

Further advantageous developments of the invention are defined in the dependent claims.

A number of exemplary embodiments are described in more detail in the following text with reference to the appended figures, in which:

FIG. 13 shows a vertical section through a fourteenth embodiment of the connection piece, the clamping unit and the nozzle in a device, in particular in a casting machine.

Identical components are designated by the same references throughout the figures.

Figure 1:
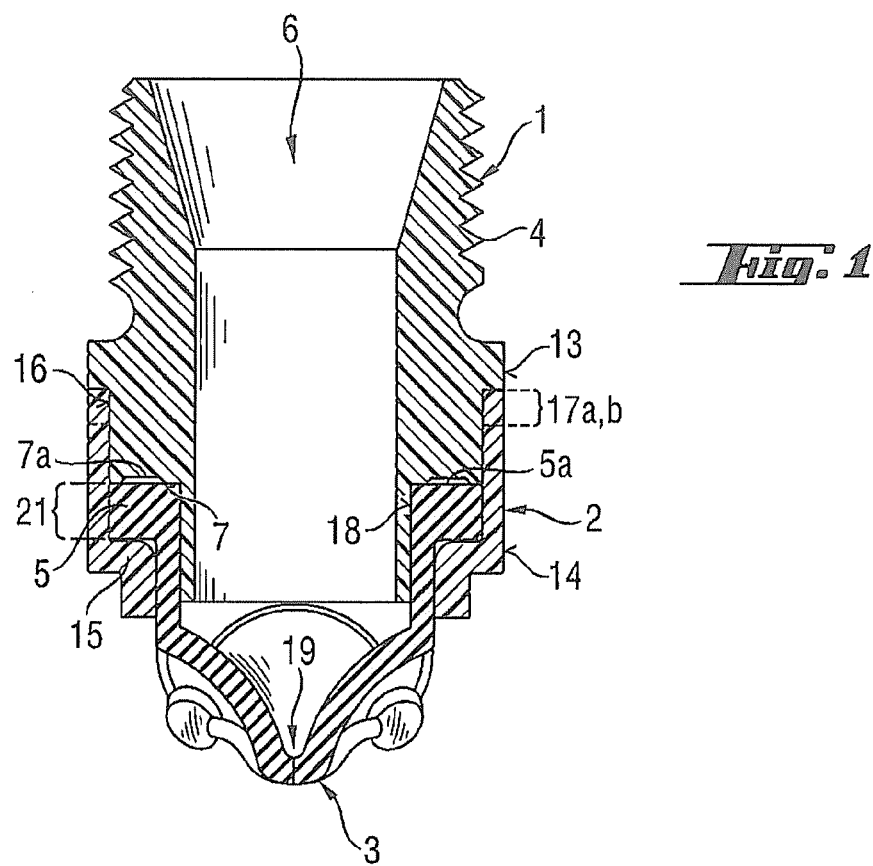
FIG. 1 shows a vertical section through the connection piece, the clamping unit and the nozzle.
Figure 2:
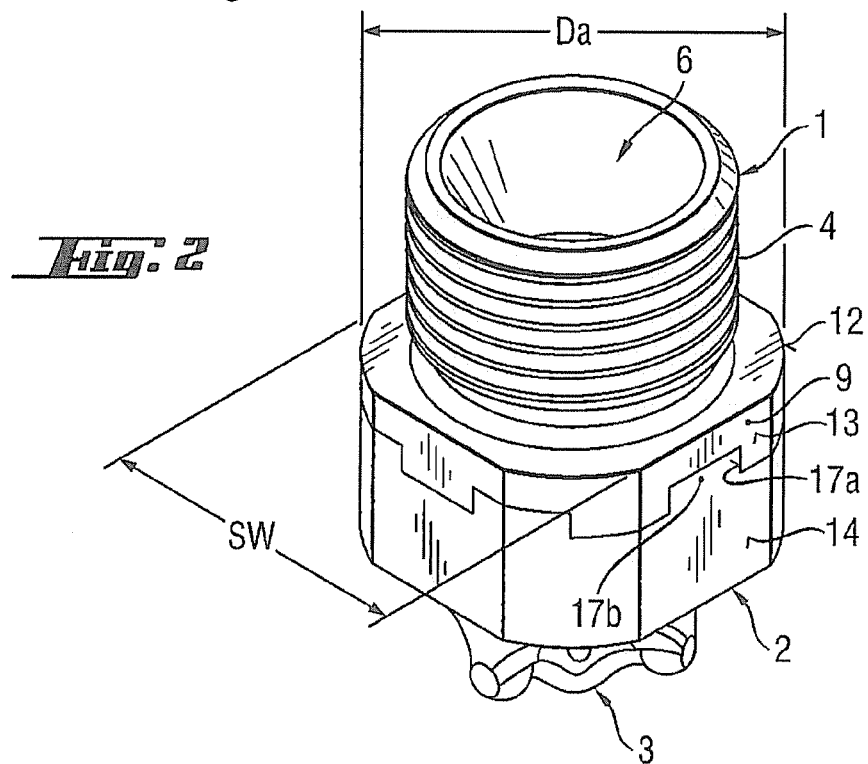
FIG. 2 shows a perspective view of the first embodiment shown in FIG. 1.

FIGS. 1 and 2 show a first embodiment of the present invention. The connection piece 1 is a hollow cylinder and consists of a plastics material, POM6. A region of the radial outer surface of the hollow cylinder has a thread 4 for fastening the connection piece 1 in a device, i.e. in a nozzle plate of a casting machine. The thread 4 is adjoined by a cylindrical region 12, the outside diameter of which represents the maximum outside diameter Da of the connection piece 1. On this cylinder 12 that is formed by the maximum outside diameter there are formed four surfaces 13, which represent a width across flats SW for a mounting tool. The maximum outside diameter is adjoined by a cylindrical extension 16, the outside diameter of which is smaller than the maximum outside diameter Da. Further, the connection piece 1 has, at the end arranged opposite the thread 4, a surface 7 in the form of a circular ring for holding a flange surface of a flange 5 of the nozzle 3. The hollow cylindrical form of the connection piece 1 results from a cylindrical outer form and a coaxially arranged through-hole. At the end of the connection piece with the thread, the hole tapers conically. The funnel shape that is produced thereby inside the connection piece 1 guides a mass to be cast through the connection piece 1 into the nozzle 3.

Furthermore, a clamping unit 2 is present, said clamping unit 2 likewise consisting of a plastics material, for example POM 6, and being connected to the connection piece 1. The two components 1, 2 are welded together, for example ultrasonically welded or laser welded. The outside diameter of the clamping unit 2 corresponds to the maximum outside diameter of the connection piece 1. Furthermore, the clamping unit 2 has a shoulder 15, which is suitable for pushing the flange 5 of the nozzle 3 against the surface 7 of the connection piece 1. Once the components 1, 2 and 3 have been connected, the shoulder 15 of the clamping unit 2 axially fixes the nozzle 3.

The outer lateral surface of the clamping unit 2 has surfaces 14 which correspond to the width across flats SW of the connection piece 1 and its surfaces 13, so that, following the mounting of the components 1, 2 and 3, four surfaces 13, 14 are formed jointly on the outside diameters of the connection piece 1 and of the clamping unit 2, on which a mounting tool is positioned for fastening the connection plate in a nozzle plate of a casting machine. In this case, the connection piece 1 has in the region of the tool engagement surface four grooves 17a, into which four corresponding claws 17b of the clamping unit 2 engage axially and act in a radially form-fitting manner, in order to introduce the torque of the mounting tool into the thread 4 on the connection piece 1. The clamping unit 2 extends axially beyond the connection piece 1 and supports the nozzle 3 by way of the inside diameter.

The nozzle 3 consists of an elastic material, for example NBR, and has two openings. One opening 18 is surrounded by a flange 5. The other opening 19 is closed by at least three elastic nozzle flaps. The nozzle 3 is mounted in a machine, i.e. a casting machine, as follows. The flange 5 of the nozzle 3 is pushed against the surface 7 in the form of a circular ring of the connection piece 1 and is pressed with the clamping unit 2 against the connection piece 1. The flange 5 of the nozzle 3 is arranged between the connection piece 1 and the clamping unit 2 and is fixed between the two components by the connection of the clamping unit 2 to the connection piece 1. In the process, the flange 5 is received by a chamber 21 which is formed on the inside and at the top by the connection piece 1 and on the outside and at the bottom by the clamping unit 2.

Figure 3:
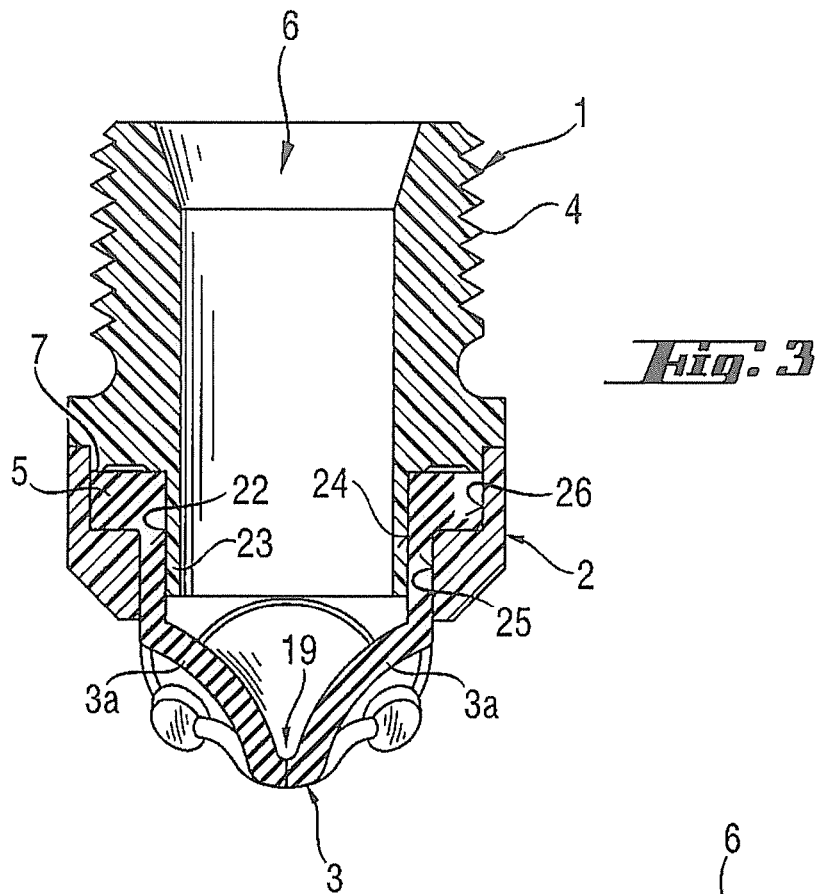
FIG. 3 shows a vertical section through a second embodiment of the connection piece, the clamping unit and the nozzle.

FIG. 3 shows a second embodiment of the connection piece 1 according to the invention, which has at a radially outer end, as described above, a thread 4 for fastening the connection piece 1 in a device. Further, the connection piece 1 has a coaxially arranged hole having a conical countersink 6. The countersink 6 is arranged at that end of the connection piece that has the thread 4. Formed at the opposite end of the connection piece 1 is a surface 7, against which the nozzle flange 5 of the nozzle 3 is pressed. The flange 7 is adjoined in the axial direction by a cylindrical lateral surface 22 of a guide tube 23 arranged on the connection piece 1, the outer surface of said guide tube 23 coming into contact with and supporting the inner wall surface of the nozzle 3 in the mounted state.

The clamping unit 2 has a cylindrical form with an outside diameter which corresponds to the outside diameter of the connection piece 1. The inside diameter of the clamping unit 2 is smaller than the outside diameter of the nozzle 3. As a result, in the mounted state the inside diameter of the clamping unit 2 exerts a pressure on the nozzle flaps 3a and closes the opening 19 in the nozzle 3. The clamping unit 2 furthermore has a shoulder 26 in the form of an L, which holds the cylindrical nozzle flange 5.

The nozzle 3 is pressed against the surface 7 of the connection piece 1 and is fixed by the clamping unit 2. The components are connected together by welding. Then, the connection piece 1 is fastened, for example screwed, by way of the fastening device 4 in a device, for example a nozzle plate, of a casting machine. The material to be cast first of all flows through the conical opening 6 or the countersink in the connection piece 1 and through the hole into the nozzle 3. The nozzle has nozzle flaps 3a, which are opened by the pressure of the mass and are bounded and stabilized by the connection piece 1 and/or clamping unit 2 during the open state.

Figure 4:
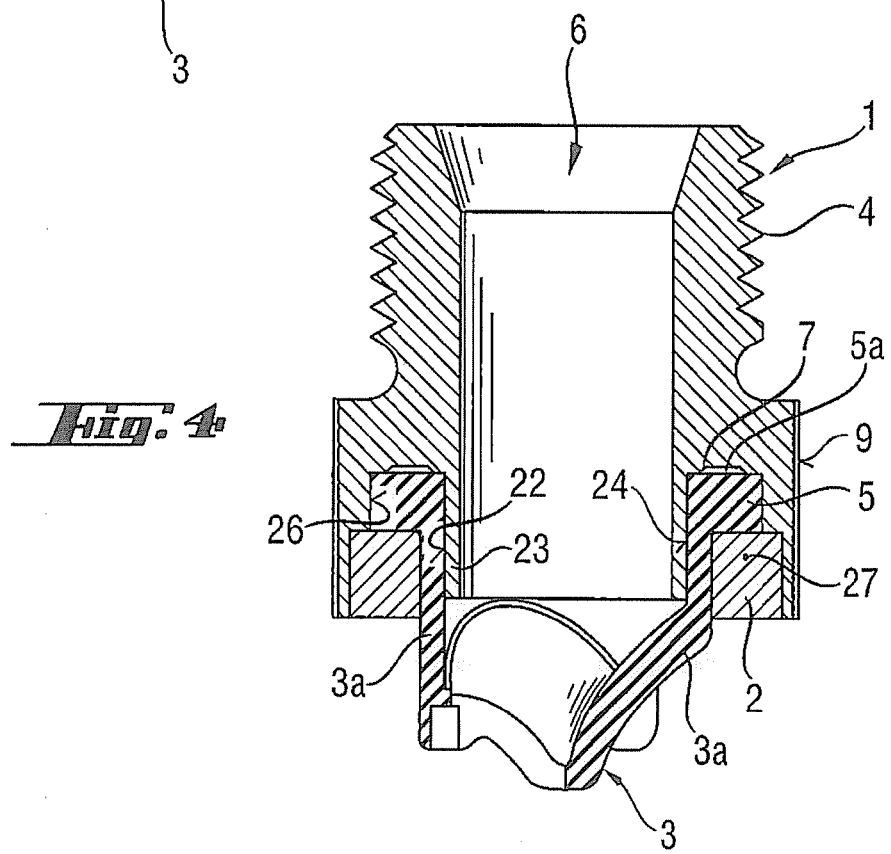
FIG. 4 shows a vertical section through a third embodiment of the connection piece, the clamping unit and the nozzle.

FIG. 4 shows a third embodiment, wherein the connection piece 1, as described above, has a conical opening 6 with an adjacent hole and also an external thread 4. The outside diameter of the connection piece 1 is provided with a width across flats or a knurl 9, so that the connection piece 1 can be mounted manually. Further, the connection piece 1 has a surface 7 for holding a nozzle surface 5a. The nozzle 3 is pushed against this surface 7 and fixed by a clamping unit 2 which is fitted in a surface 27 of the connection piece 1. Thus, the connection piece 1 has not only a surface 7 for holding the nozzle flange 5, but also a cylindrical surface 27 for holding the clamping unit 2. The mounted clamping unit 2 does not protrude beyond the connection element 1, but terminates flush with the connection piece 1. The connection piece 1 and the clamping unit 2 consist of metal, in particular a corrosion-resistant steel or stainless steel. The components are welded or adhesively bonded together.

Figure 5:
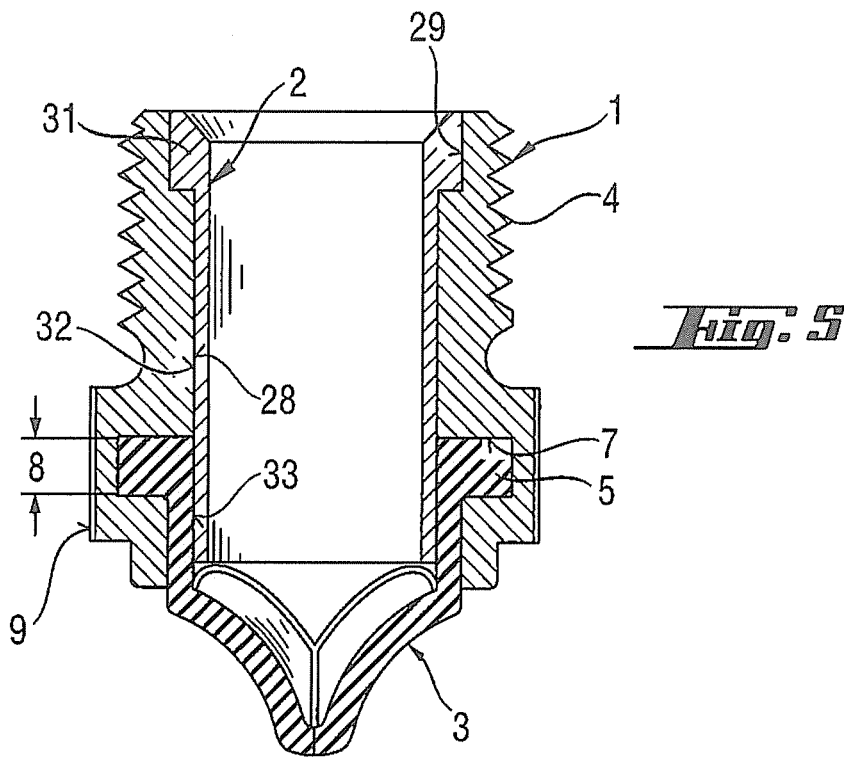
FIG. 5 shows a vertical section through a fourth embodiment of the connection piece, the clamping unit and the nozzle.

FIG. 5 shows a fourth embodiment, wherein the connection piece 1 has at one end an external thread 4 and a flat countersink 29 that adjoins the hole 28. The clamping unit 2 is inserted into the inside diameter, i.e. the hole 28, of the connection piece 1. The clamping unit 2 has a terminating flange 31 which is positioned in a flush manner in the flat countersink 29 in the connection piece 1. The connection piece 1 also has a groove 8 which adjoins the inside diameter of the hole 28. The nozzle 3 is placed by way of its flange in this groove 8 in the connection piece 1 so that the nozzle 3 is placed partially in the connection piece 1.

In order that the nozzle 3 can be mounted in the casting machine, it is first of all inserted by way of the flange 5 into the groove 8 in the connection piece 1 and subsequently the clamping unit 2 is inserted into the hole 28 in the connection piece 1 until the terminating flange 31 of the clamping unit 2 sits in the flat countersink 29 in the connection piece 1. The clamping unit 2 presses by way of its outer lateral surface 32 against the inner lateral surface 33 of nozzle 3 and braces it to the connection piece 1. In addition, the connection piece 1 is connected, in particular adhesively bonded or welded, to the clamping unit 2. The connection piece 1, which is formed here from metal, has a knurl 9 in its outside diameter region.

Figure 6:
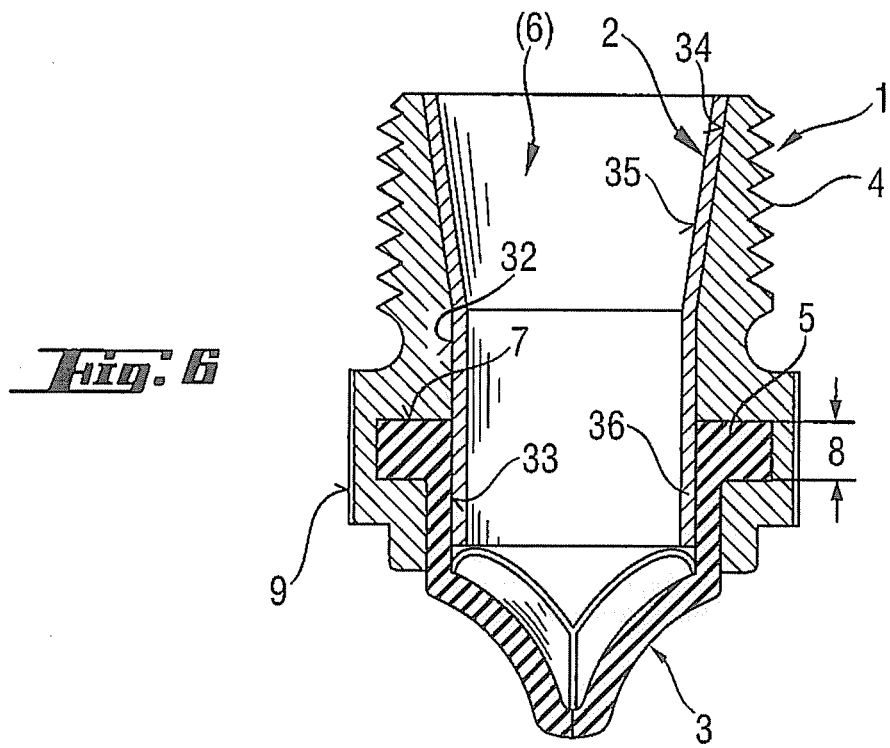
FIG. 6 shows a vertical section through a fifth embodiment of the connection piece, the clamping unit and the nozzle.

FIG. 6 shows a construction similar to FIG. 5. However, the connection piece 1 does not have a flat countersink in the region with the fastening device 4, but rather a conical region 34. The clamping unit 2 likewise has a conical region 35 at one end. Once the nozzle 3 has been inserted into the groove 8 in the connection piece 1, as already described in FIG. 5, the clamping unit 2 is pushed into the connection piece 1. The two conical ends 34, 35 are then braced together and the clamping unit 2 pushes furthermore against the nozzle 3 and braces the latter to the connection element 1. The conical region 35 of the clamping unit 2 conveys the inflow of mass to be cast into the nozzle 3.

Figure 7:
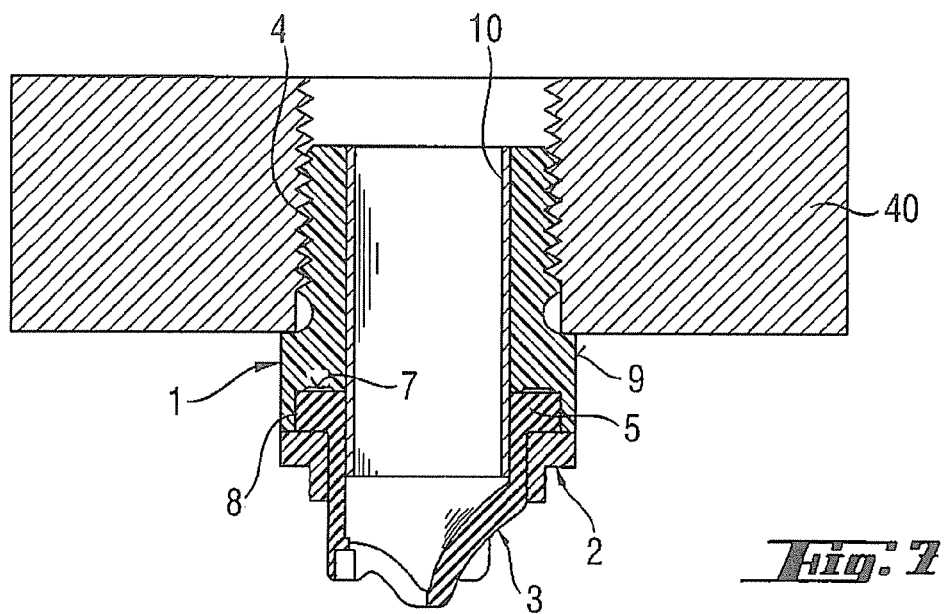
FIG. 7 shows a vertical section through a sixth embodiment of the connection piece, the clamping unit and the nozzle in a device, in particular in a casting machine.

FIG. 7 shows a sixth embodiment, wherein the connection piece 1 is fastened in a device, in particular a nozzle plate 40 of a casting machine. One end of the connection piece 1 is provided with a turned groove or flat countersink, in which the flange 5 of a nozzle 3 is arranged. The clamping unit 2 is arranged on the surface of the connection piece 1 and pushes against the nozzle flange of the nozzle 3. The components are connected together, in particular welded. A sleeve 10 consists of a tubular material and is pushed into the connection piece 1 until the sleeve 10 terminates flush with the connection piece 1 and at least partially supports the nozzle 3. The sleeve 10 establishes a radial pressure on the nozzle 3 and additionally braces the nozzle 3 in the connection piece 1. The sleeve 10 consists of a material which has a favorable effect on the mass to be cast while it is introduced into the nozzle 3 and reduces, for example, turbulence and the generation of heat.

Figure 8:
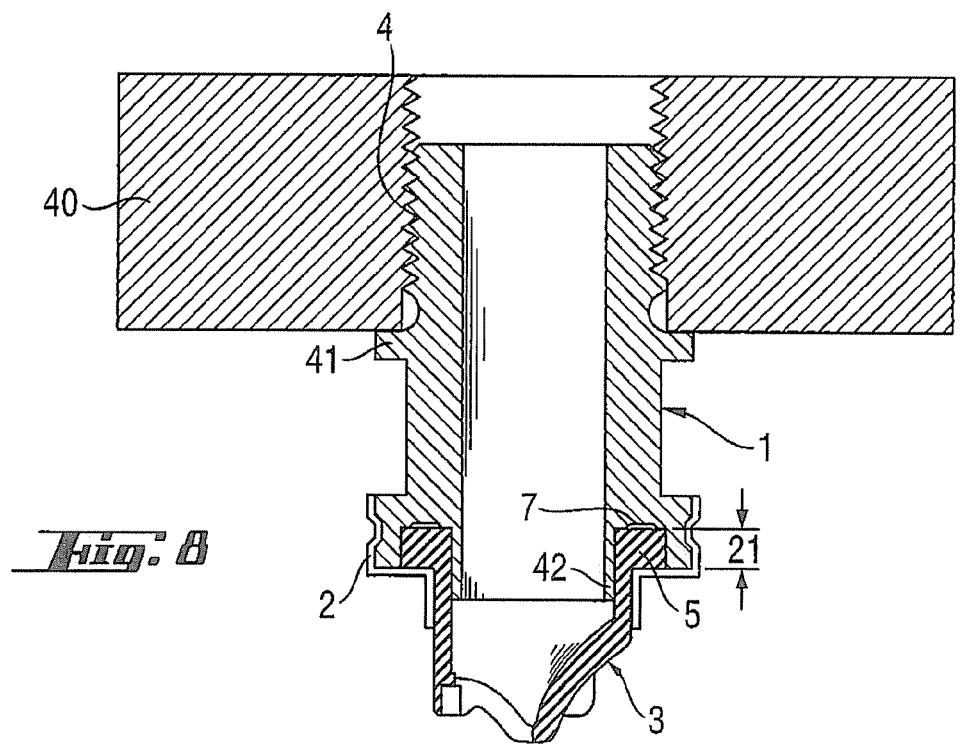
FIG. 8 shows a vertical section through a seventh embodiment of the connection piece, the clamping unit and the nozzle in a device, in particular in a casting machine.

FIG. 8 shows a seventh embodiment, wherein the connection piece 1 has a stop flange 41 which adjoins a fastening device 4, in particular a thread. The thread 4 is screwed into the device, for example the nozzle plate 40, until the stop 41 butts against the device 40. The connection piece 1 has a holder 21 for a nozzle flange 5 at an end arranged opposite the thread 4. This holder 21 is a turned portion in the connection piece 1 so that a thin-walled hollow cylinder 42 remains at this end. A nozzle flange of a nozzle 3 is pushed via this thin-walled hollow cylinder into the holder 21 in the connection piece 1, wherein the outside diameter of the hollow cylinder pushes against the inside diameter of the nozzle 3 and stabilizes or clamps the nozzle 3. A clamping unit 2 pushes against the nozzle flange 5 and a sub-region of the outside diameter of the nozzle 3 and holds the latter in the mounted position.

Figure 9:
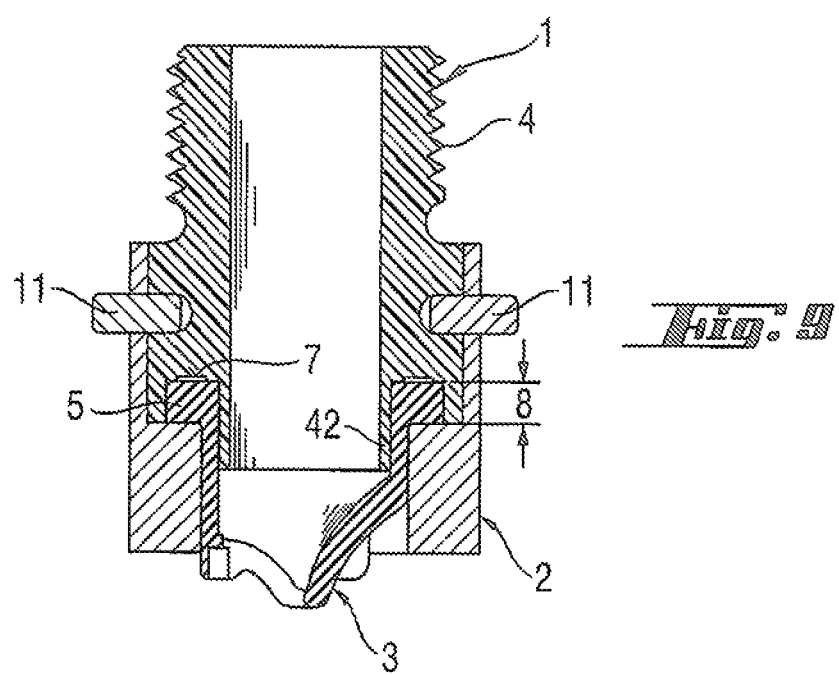
FIG. 9 shows a vertical section through an eighth embodiment of a connection piece, a clamping unit, nozzle and securing elements.
Figure 10:
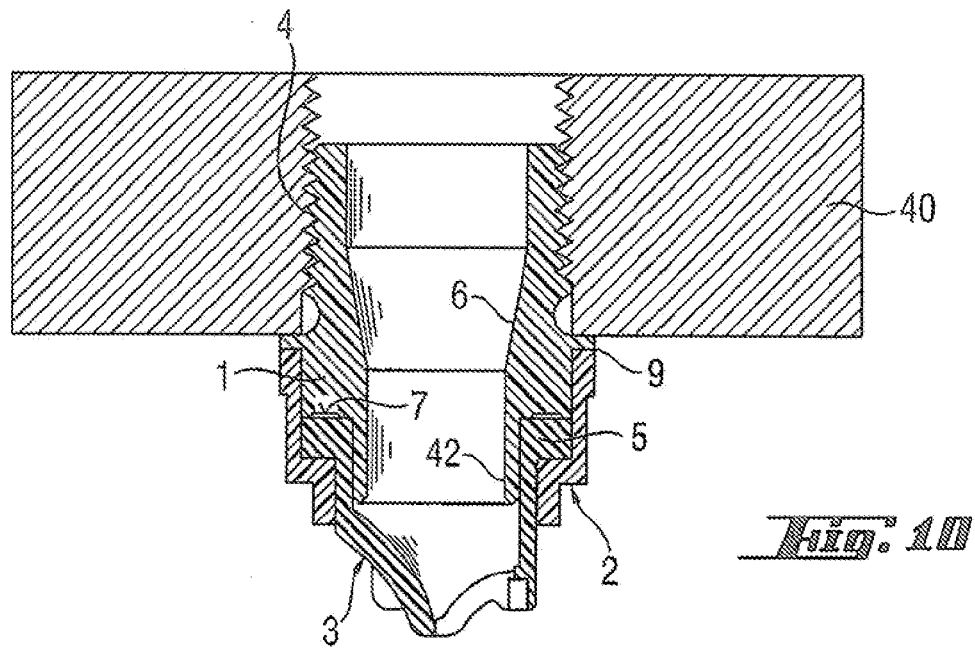
FIG. 10 shows a vertical section through a tenth embodiment of the connection piece, the clamping unit and the nozzle in a device, in particular in a casting machine.
Figure 11:
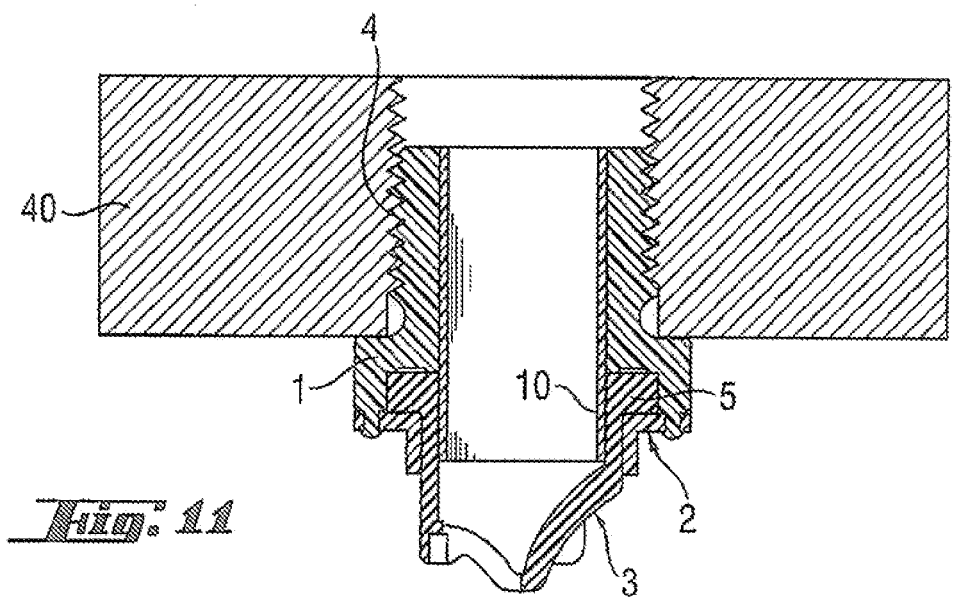
FIG. 11 shows a vertical section through an eleventh embodiment of the connection piece, the clamping unit and the nozzle in a device, in particular in a casting machine.
Figure 12:
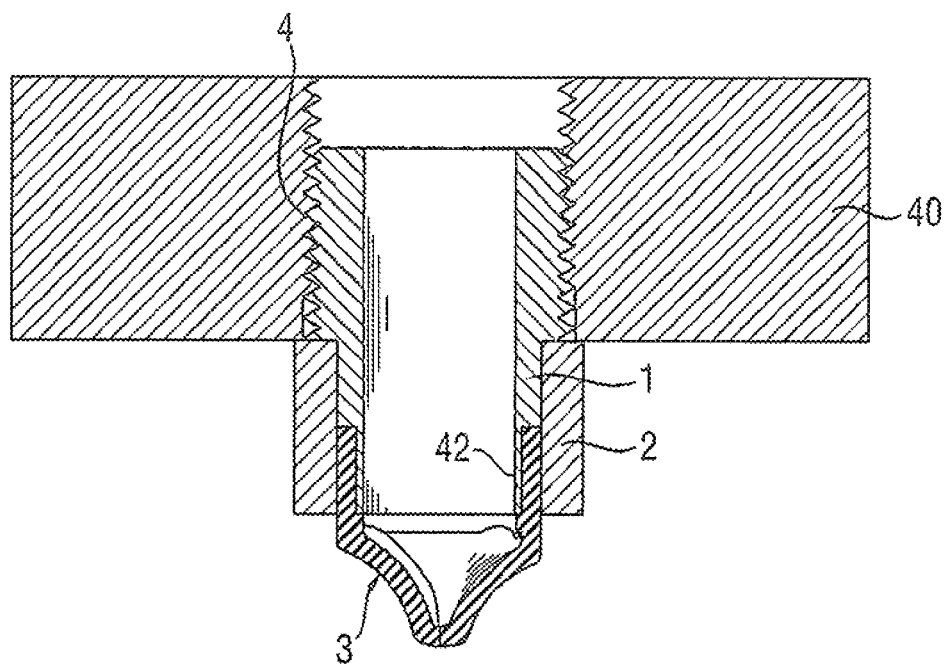
FIG. 12 shows a vertical section through a twelfth embodiment of the connection piece, the clamping unit and the nozzle in a device, in particular in a casting machine.

FIG. 9 shows an eighth embodiment. The connection piece 1 has a thread 4, which is screwed into the device, in particular a casting machine. The connection piece 1 has a hole which forms an internal hollow cylinder. That end of the connection piece 1 that is opposite the thread 4 has an outside diameter which is smaller than the outside diameter of the rest of the connection piece 1, with the inside diameter of the connection piece 1 forming with the outer region a thin-walled hollow cylinder 42. A groove 8 for holding a nozzle flange 5 is turned into the turned-in surface. Furthermore, the connection piece 1 has at least two radially arranged holders for securing elements 11.

The clamping unit 2 consists of a hollow cylinder having two different inside diameters. A sub-region of the clamping unit 2 has an inside diameter which is adapted to the connection piece 1. The adjoining smaller inside diameter is adapted to the diameter of the nozzle 3. In order to mount the nozzle 3 in the casting device, first of all the nozzle 3 is inserted into the groove 8 in the connection piece 1. The clamping unit 2 is pushed over the nozzle 3 and a region of the connection piece 1 so that an inner flange of the clamping unit 2 pushes against the nozzle flange 5 and fixes the latter. Then, the securing elements 11 are attached, said securing elements 11 preventing axial displacement of the clamping unit 2 against the connection piece 1. The securing elements 11 are firmly connected, for example adhesively bonded, to the connection piece 1. When the mass to be cast enters the connection piece 1 and passes through the internal cylinder of the connection piece 1 into the nozzle 3, a pressure is exerted on the nozzle 3 and would decouple the latter from the connection piece 1 without countermeasures being taken. Since the flange of the nozzle 3 is pressed by the clamping unit 2 against the groove 8 in the connection piece 1 and is held in this position by the securing elements 11, the pressure of the mass to be cast cannot remove the nozzle 3 from its position.

The invention claimed is:

1. A casting machine having a nozzle assembly comprising
a connection piece for fastening an elastic nozzle in a casting machine for casting food liquids,
a clamping unit and
a nozzle,
said connection piece having first and second ends,
a fastening device at said first end, such that the connection piece is removable from a nozzle plate, and
the nozzle being at said second end, wherein
the fastening device is a thread,
the clamping unit is connectable to the second end of the connection piece,
at least one of the connection piece and the clamping unit has a holder for the nozzle and the nozzle is connectable to the connection piece and is holdable in or on the connection piece,
the nozzle is replaceable by a connection piece which has a new nozzle and
the clamping unit and a seat of the clamping unit on the connection piece are constructed such that, in order to replace the nozzle from the connection piece, the nozzle and/or the clamping unit have to be destroyed, that is to say the nozzle and/or the clamping unit cannot be removed from the connection piece without being destroyed, such that in the event of a replacement being made both the nozzle and the clamping unit must be replaced and
the nozzle has nozzle flaps, which are opened by the pressure of the mass, wherein the connection piece and/or clamping unit are constructed, such that the nozzle flaps are bounded and stabilized the connection piece and/or clamping unit during the open state.

2. The casting machine as claimed in claim 1, wherein the connection piece has a hollow cylindrical form.

3. The casting machine as claimed in claim 2, wherein an internal cylinder of the hollow cylinder has a conical region at the end having the fastening device of the connection piece.

4. The casting machine as claimed in claim 1, wherein an inside diameter of the connection piece is smaller than an outside diameter of the nozzle.

5. The casting machine as claimed in claim 1, wherein the connection piece has a surface for holding a flange surface of a flange of the nozzle or has a groove for holding a flange of the nozzle.

6. The casting machine as claimed in claim 1, wherein a radial and or axial surface of the connection piece is connectable to the nozzle.

7. The casting machine as claimed in claim 1, wherein an outer surface of the connection piece has a mounting device.

8. The casting machine as claimed in claim 1, wherein the nozzle is arrangeable in a recessed manner in the connection piece.

9. The casting machine as claimed in claim 1, wherein the connection piece has a fastening device at both ends.

10. The casting machine as claimed in claim 1, wherein the connection piece consists of metal or of plastic.

11. The casting machine as claimed in claim 1, wherein the connection piece is connectable to at least one of the nozzle and the clamping unit.

12. The casting machine as claimed in claim 1, wherein the connection piece has an internal space to accommodate a sleeve.

13. The casting machine as claimed in claim 1, wherein at least one securing element is arranged in the connection piece and the clamping unit.

14. The casting machine as claimed in claim 1, wherein at least one surface of the clamping unit is connectable to the nozzle.

15. The casting machine as claimed in claim 14, wherein the clamping unit has the form of a hollow cylinder.

16. The casting machine as claimed in claim 14, wherein the clamping unit fastens the nozzle in or to the connection piece.

17. The casting machine as claimed in claim 14, wherein the clamping unit is arrangeable in the connection piece.

18. The casting machine as claimed in claim 14, wherein the clamping unit consists of metal of plastic.

19. The casting machine as claimed in claim 14, wherein an outer surface of the clamping unit has a mounting device.

20. The casting machine as claimed in claim 19, wherein the mounting device is a width across flats or a knurl.

* * * * *